(12) United States Patent
Said et al.

(10) Patent No.: US 8,515,094 B2
(45) Date of Patent: Aug. 20, 2013

(54) DISTRIBUTED SIGNAL PROCESSING SYSTEMS AND METHODS

(75) Inventors: Amir Said, Cupertino, CA (US); Ton Kalker, Mountain View, CA (US); Majid Fozunbal, Bayonne, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 12/902,907

(22) Filed: Oct. 12, 2010

(65) Prior Publication Data
US 2012/0087512 A1   Apr. 12, 2012

(51) Int. Cl.
*H04R 3/00* (2006.01)
(52) U.S. Cl.
USPC ............. 381/92; 367/119; 367/123; 367/129; 367/153; 367/154
(58) Field of Classification Search
USPC ............ 381/92; 367/119, 123, 129, 153–154
See application file for complete search history.

(56) References Cited

U.S. PATENT DOCUMENTS

| | | | |
|---|---|---|---|
| 3,611,201 A * | 10/1971 | Goell | 333/18 |
| 4,772,764 A | 9/1988 | Dorr | |
| 6,141,293 A | 10/2000 | Amorai-Moriya et al. | |
| 7,231,054 B1 * | 6/2007 | Jot et al. | 381/310 |
| 7,236,426 B2 | 6/2007 | Turner et al. | |
| 7,411,581 B2 | 8/2008 | Hardie-Bick | |
| 2005/0111674 A1 * | 5/2005 | Hsu | 381/92 |
| 2005/0150697 A1 | 7/2005 | Altman et al. | |
| 2006/0210096 A1 * | 9/2006 | Stokes et al. | 381/107 |
| 2007/0188476 A1 | 8/2007 | Bayramoglu et al. | |
| 2007/0291968 A1 | 12/2007 | Joublin et al. | |
| 2008/0144876 A1 | 6/2008 | Reining et al. | |
| 2010/0026667 A1 | 2/2010 | Bernstein | |
| 2011/0015893 A1 * | 1/2011 | Altman et al. | 702/150 |

FOREIGN PATENT DOCUMENTS

| | | |
|---|---|---|
| GB | 2 327 266 A | 1/1999 |
| JP | 5161190 A | 6/1993 |

OTHER PUBLICATIONS

Valin, Jean-Marc et al. "Robust Sound Source Localization Using a Microphone array on a Mobile Robot", Dept. of Electrical Engineering and Computer Engineering, Universite de Sherbrooke, Quebec, Canada.
Aarab, Parham at al., "The Fusion of distributed Microphone Arrays for Sound Localization", EURASIP Journal on Applied Signal Processing 2003, 4, 338-347, 2003 Hindawi Publishing Corporation.
Okumura, Hajime. et al., "Sound Source Localization Using a Distributed Microphones Systems", vol. 106, No. 485, pp. 61-66; 2007 (Abstract Only). Zhang, Cha, et al "Maximum Likelihood Sound source Localization and Beamforming for directional Microphone Arrays in distributed Meetings", Journal of Latex Class files, vol. 6, No, 1, Jan. 2007.
Said, Amir, et al., "Massively Parallel Processing of Signals in Dense Microphone Arrays", Circuits and Systems (ISCAS), Proceedings of 2010 IEEE International Symposium, May 30-Jun. 2, 2010, pp. 3080-3083.

* cited by examiner

*Primary Examiner* — Ahmad Matar
*Assistant Examiner* — Katherine Faley

(57) ABSTRACT

Systems and methods for parallel and distributed processing of audio signals produced by a microphone array are described. In one aspect, a distributed signal processing system includes an array of microphones and an array of processors. Each processor is connected to one of the microphones and is connected to at least two other processors, enabling communication between adjacent connected processors. The system also includes a computing device connected to each of the processors. Each microphone detects a sound and generates an audio signal, and each processor is configured to receive and process the audio signal sent from a connected microphone and audio signals sent from at least one of the adjacent processors to produce a data stream that is sent to the computing device.

20 Claims, 9 Drawing Sheets

US 8,515,094 B2

DISTRIBUTED SIGNAL PROCESSING SYSTEMS AND METHODS

TECHNICAL FIELD

This disclosure relates to processing audio signals generated by microphone arrays.

BACKGROUND

In recent years, theoretical and experimental work in the use of microphone arrays have received increased interest. For example, microphone arrays can be used in audio processing tasks such as denoising and acoustic echo cancellation. While audio processing performance may be improved by increasing the number of microphones, practical uses of large microphone arrays are often limited. For example, technological advancements are enabling the production of large integrated microphone arrays with low cost microphones. However, in general, the overall cost of processing large amounts of audio data generated by microphone arrays can be prohibitively high due to the time expended in transmitting the large number of audio signals to a central location for processing and in the cost of computational resources used to process the audio signals at the central location. Developers and users of microphone arrays continue to seek systems and methods that improve processing audio data generated by microphone arrays.

DETAILED DESCRIPTION

This disclosure is directed to systems and methods for parallel and distributed processing of audio signals produced by a microphone array. Systems can be configured to perform in parallel task specific portions of audio signal processing. Examples of systems and methods are described with reference to a particular kind of audio signal processing called "sound source localization."

The methods are mathematical in nature and, for this reason, are described below with reference to numerous equations and graphical illustrations. Although mathematical expressions alone may be sufficient to fully describe and characterize the methods to those skilled in the art of signal processing, the more graphical circuit diagram approaches included in the following discussion are intended to illustrate a number of different methods so that the methods may be accessible to readers with various backgrounds.

Figure 1:
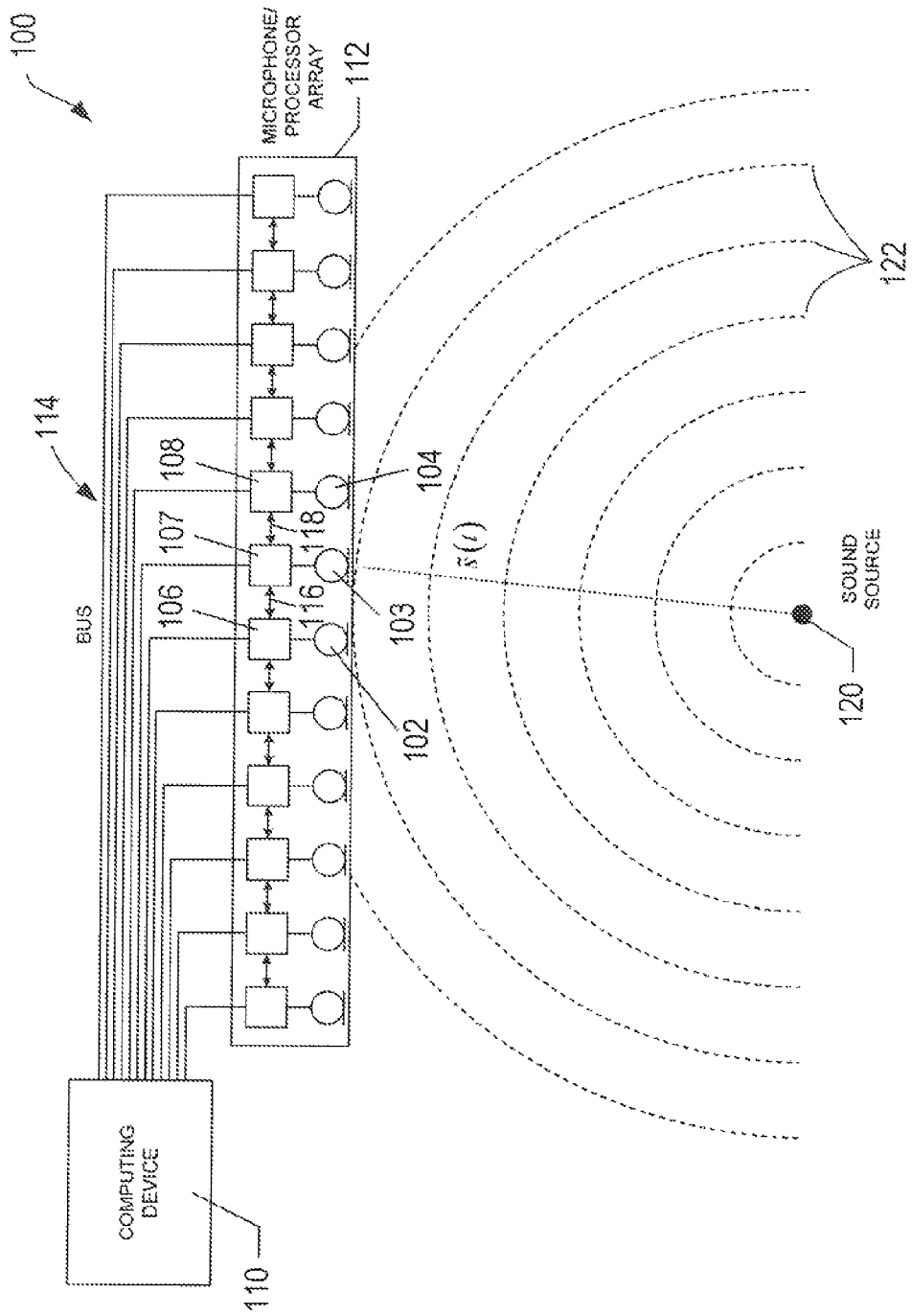
FIG. 1 shows an example parallel audio signal processing system.

FIG. 1 shows an example parallel audio signal processing system 100. The system 100 includes a one-dimensional array of 12 microphones, such as microphones 102-104; 12 separate processors, such as processors 106-108; and a computing device 110. Each microphone is connected to one of the processors and each processor is connected to adjacent processors, enabling full-bandwidth communication between adjacent processors. The microphones and processors form a one-dimensional microphone/processor array 112. Each processor is also connected to a bus 114 for sending electronic signals to the computing device 110. For example, the microphones 102-104 are connected to the processors 106-108, respectively. The processors 102 and 104 are adjacent, and connected, to the processor 103, as indicated by double-headed arrows 116 and 118, enabling the processor 103 full-bandwidth communication with the processors 102 and 104. The processor 107 sends a data stream of processed audio signals to the computing device 110 via the bus 114.

The audio signal processing system 100 provides a first stage of parallel processing of audio signals generated by each of the microphones at the connected processors. As shown in the example of FIG. 1, consider a sound source 120 that generates sounds represented by wavefronts 122. Each microphone separately detects sounds emanating from the sound source 120 and generates a corresponding electronic analog audio signal that is sent to a connected processor. In the first stage of parallel processing, each processor is configured to process the audio signals sent from a connected microphone and, depending on the type of signal processing task assigned to the processors, may include processing audio signals sent from one or two adjacent processors. Next, each processor outputs a data stream to the computing device 110 for a second stage of processing. In other words, the processors connected to the microphones perform a first state of distributed parallel processing of audio signals generated by the microphones followed by a second stage of centralized processing of the data produced by the processors at the computing device 110. For example, sounds produced by the sound source 120 are converted by the microphone 103 into an analog or digital audio signal that is sent to connected processor 107. The processors 106 and 108 may also send one or both of the audio signals generated by connected microphones 102 and 104 to the processor 103, depending on the type of audio signal processing task to be performed at the processors and by the system 100 as a whole. The processor 103 produces a data stream that is sent to the computing device 110 over the bus 114 for further processing along with the data streams produced by the other processors.

The system 100 can be configured to determine the approximate coordinate location of the sound source 120 located in front of the microphone array. The processors are configured to perform a first stage distributed, parallel signal-processing portion of a sound source localization method. The computing device 110 is then operated to perform a second stage of the sound source localization method by further processing the data generated by the processors, resulting in an approximate coordinate location of the sound source 120.

Figure 2:
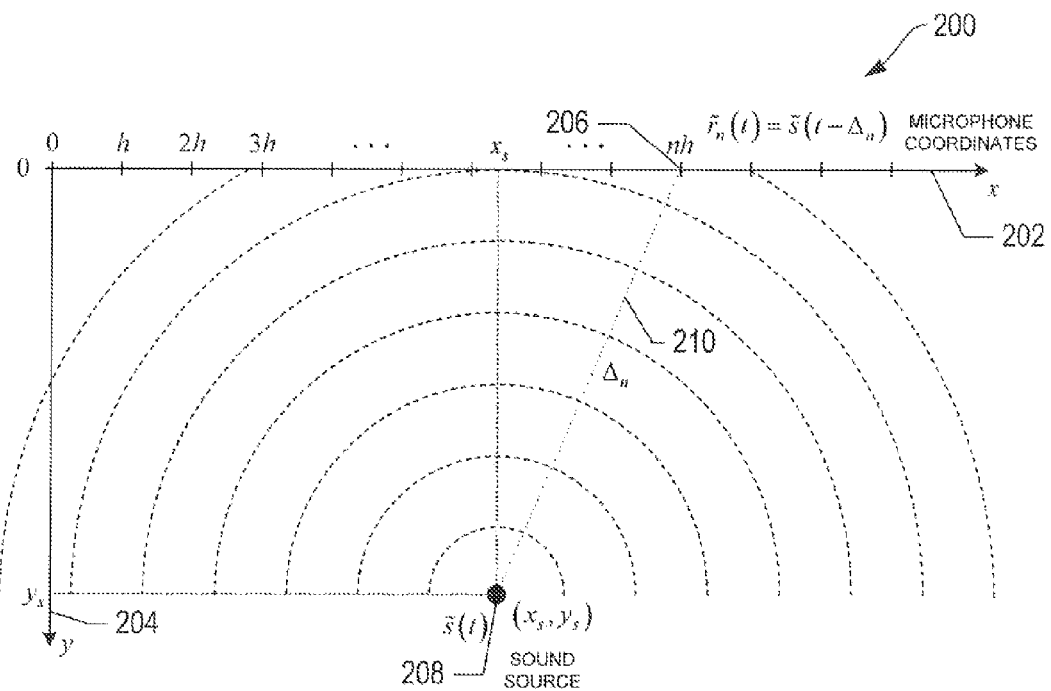
FIG. 2 shows an example Cartesian coordinate axis system.

FIG. 2 shows an example Cartesian coordinate axis system 200 in order to introduce the mathematical notation used to describe the methods and systems for performing sound source localization. The system 200 includes an x-coordinate axis 202 and a y-coordinate axis 204. Regularly spaced marks located along the x-axis 202 represent the coordinate locations of regularly spaced microphones of a one-dimensional microphone array. In the example of FIG. 2, a single sound source 208 has coordinate location $(x_s, y_s)$ and generates an analog audio signal $\tilde{s}(t)$, where t is time. For example, the coordinate location of a microphone number n 206 is (nh,0), where h represents the distance between microphones, and the analog audio signal detected by the microphone n is represented by $$\tilde{r}_n(t) = \tilde{s}(t - \Delta_n) \quad \text{Eq. (1)}$$

where $$\Delta_n = \sqrt{(nh - x_s)^2 + y_s^2}/c \quad \text{Eq. (2)}$$

represents the sound propagation delay 210 and c represents the speed of sound.

The notation of Equations (1) and (2) can be simplified using the following change of variables:

$$\tau = \frac{ct}{h}, \quad \text{Eq. (3a)}$$

$$\delta_n = \frac{c\Delta_n}{h}, \quad \text{Eq. (3b)}$$

$$u = \frac{x_s}{h}, \text{ and} \quad \text{Eq. (3c)}$$

$$v = \frac{y_s}{h} \quad \text{Eq. (3d)}$$

where $\tau = 1$ is the time it takes for sound to travel the distance h between adjacent microphones. As a result, the audio signal generated by the sound source 208 is represented by $$s(\tau) = \tilde{s}(h\tau/c) \quad \text{Eq. (4a)}$$

and the analog audio signal detected by a microphone n is represented by $$r_n(\tau) = \tilde{r}_n(h\tau/c) \quad \text{Eq. (4b)}$$

Using the simplified notation, the analog audio signal detected by the microphone n can also be represented by $$r_n(\tau) = s(\tau - \delta_n) \quad \text{Eq. (5)}$$

where the time delay 210 is now represented by $$\delta_n = \sqrt{(n-u)^2 + v^2} \quad \text{Eq. (6)}$$

An approximate coordinate location of the sound source 208 using a one-dimensional microphone/processor array can be determined in a number of different ways. The first stage of determining the approximate coordinate location of the sound source 208 is to determine an estimated time delay difference between certain pairs of microphones. These time delay differences are computed in parallel at each of the processors of the microphone/processor array. In the second stage, the time delay differences are then sent to the computing device, which uses the time delay differences to determine the approximate coordinate location of the sound source 208.

Figure 3:
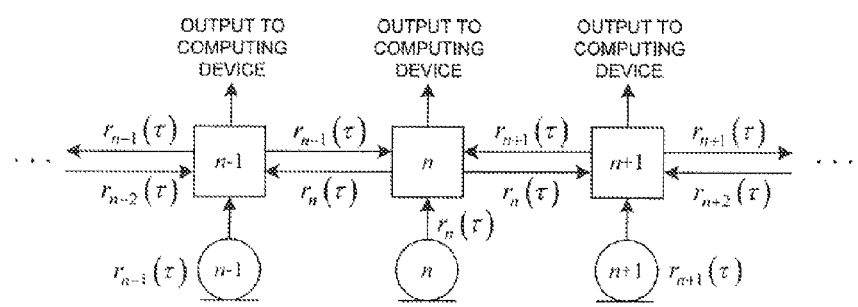
FIG. 3 shows an example of three adjacent microphones and processors of a microphone/processor array.

FIG. 3 shows an example of three adjacent microphones and processors identified as n−1, n, and n+1 of a large microphone/processor array. In one example now described, the time delay difference between the two microphones n−1 and n+1 is $(\delta_{n+1} - \delta_{n-1})$, an estimate of which is determined by the processor n using the measured audio signals $r_{n-1}(\tau)$, $r_n(\tau)$, and $r_{n+1}(\tau)$ detected by corresponding microphones n−1, n, and n+1. The processors n−1, n, and n+1 receive the audio signals $r_{n-1}(\tau)$, $r_n(\tau)$, and $r_{n+1}(\tau)$ from the microphones n−1, n, and n+1, respectively. The processor n then receives the audio signal $r_{n-1}(\tau)$ from the adjacent microphone n−1 and receives the audio signal $r_{n+1}(\tau)$ from the adjacent microphone n+1. The processor n processes the audio signals $r_{n-1}(\tau)$, $r_n(\tau)$, and $r_{n+1}(\tau)$ and outputs an estimate of $(\delta_{n+1} - \delta_{n-1})$ in a data stream to the computing device (not shown). The processors n−1 and n+1 also perform the same signal processing operations as processor n but with audio signals captured by connected microphones and audio signals received from adjacent processors. The estimated time delay differences are computed in parallel and sent to the computing device to determine an approximate coordinate location $(\hat{u}, \hat{v})$ (i.e., $(x_s, y_s) \approx (h\hat{u}, h\hat{v})$) of the sound source 208.

The signal processing operations performed by each processor of a microphone/processor array is now described for a first system and method of determining an approximate coordinate location of the sound source 208. In the first stage of determining the approximate coordinate location of the sound source 208, each processor n is configured to determine an estimate of the time delay difference $(\delta_{n+1} - \delta_{n-1})$ between the microphones n−1 and n+1, which is given by:

$$\frac{\omega_n}{\gamma_n} = (\delta_{n+1} - \delta_{n-1}) + \varepsilon_n \quad \text{Eq. (7)}$$

where $$\omega_n = \int_0^T \psi(\tau) r'_n(\tau)[r_{n-1}(\tau) - r_{n+1}(\tau)] d\tau, \text{ and} \quad \text{Eq. (8)}$$

$$\gamma_n = \int_0^T \psi(\tau)[r'(\tau)_n]^2 d\tau \quad \text{Eq. (9)}$$

is a normalizing factor. The function $\psi(\tau)$ is a window function with the property that $\psi(\tau) > 0$ for $\tau \in (0, T)$, where T is a selected period of time, and $\varepsilon_n$ is the approximate error given by $$\varepsilon_n \gamma_n = \sum_{k=2}^{\infty} \frac{(\delta_n - \delta_{n-1})^2 - (\delta_n - \delta_{n+1})^2}{k!} \times \quad \text{Eq. (10)}$$

$$\int_0^T \psi(\tau) s^{(1)}(\tau - \delta_n) s^{(k)}(\tau - \delta_n) d\tau$$

Equations (7)-(9) are obtained by assuming the time delay difference is small as explained below in APPENDIX I.

Figure 4A:
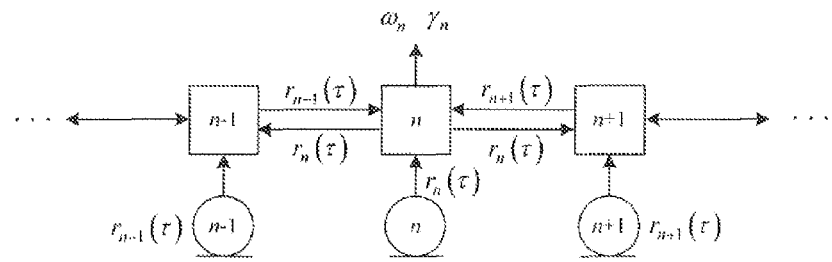
FIG. 4A shows an example of audio signals sent to a processor.
Figure 4B:
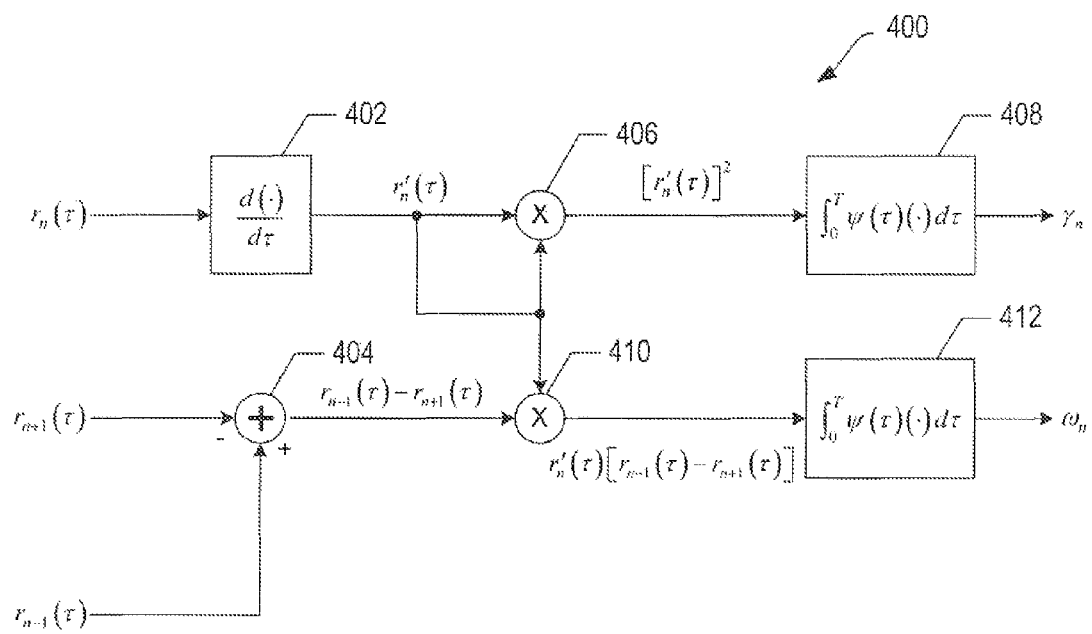
FIG. 4B shows an example block circuit diagram representing signal processing operation performed by a processor.

FIG. 4A shows an example of audio signals sent to the processor n that outputs $\omega_n$ and $\gamma_n$ (i.e., $\omega_n/\gamma_n \approx (\delta_{n-1} - \delta_{n+1})$). As show in FIG. 4A, the processors n−1, n, and n+1 receive the audio signals $r_{n-1}(\tau)$, $r_n(\tau)$, and $R_{n+1}(\tau)$ from the microphones n−1, n, and n+1, respectively. The processor n then receives the audio signal $r_{n-1}(\tau)$ from the adjacent processor n−1 and receives the audio signal $r_{n+1}(\tau)$ from the adjacent processor n+1. FIG. 4B shows an example block circuit diagram 400 representing the signal processing operation performed by the processor n on the audio signals $r_{n-1}(\tau)$, $r_n(\tau)$, and $r_{n+1}(\tau)$. As shown in FIG. 4B, the audio signal $r_n(\tau)$ produced by the microphone n is input to a derivate generating element 402, which outputs the derivative $r_n'(\tau)$. The audio signals produced by the processors n−1 and n+1 are input to a summing junction 404, which outputs audio signal difference $r_{n-1}(\tau)-r_{n+1}(\tau)$. The derivative $r_n'(\tau)$ is squared at product junction 406 to produce $[r_n'(\tau)]^2$, which, in turn, is input to integrating element 408 producing normalizing factor $\gamma_n$. Circuit diagram 400 also reveals that the derivative $r_n'(\tau)$ is multiplied by the difference $r_{n-1}(\tau)-r_{n+1}(\tau)$ at product junction 410 to produce $r_n'(\tau) [r_{n-1}(\tau)-r_{n+1}(\tau)]$, which, in turn, is input to integrating element 412 producing $\omega_n$. The processor n then computes and outputs $\omega_n$ and $\gamma_n$, as shown in FIG. 4A.

The processors of a microphone/processor array compute, in parallel, $(\omega_1,\gamma_1), \ldots, (\omega_n,\gamma_n), \ldots$, which are used to compute approximate time delay differences at the computing device. Next, the values $\omega_n$ and $\gamma_n$ output from each processor are sent to a computing device to determine an approximate sound source location $(\hat{u},\hat{v})$. A derivation of the equations used to determine $(\hat{u},\hat{v})$ for the first example is now described. The estimated time delay differences $\omega_n/\gamma_n$ are linearly distributed enabling the approximate sound source location $(\hat{u},\hat{v})$ to be determined by solving a linear model of the form $$\frac{\omega_n}{\gamma_n} \approx \hat{a}(n-q)+\hat{b} \qquad \text{Eq. (11)}$$

where n=q−R, q−R+1, ..., q+R−1, and q+R and $$q = \underset{n}{\operatorname{argmin}}(|\omega_n|/\gamma_n),$$

using linear regression. The minimum time delay difference $|\omega_q|/\gamma_q$ occurs at n=q, where R is an integer selected to define a neighborhood surrounding q.

Figure 5A:
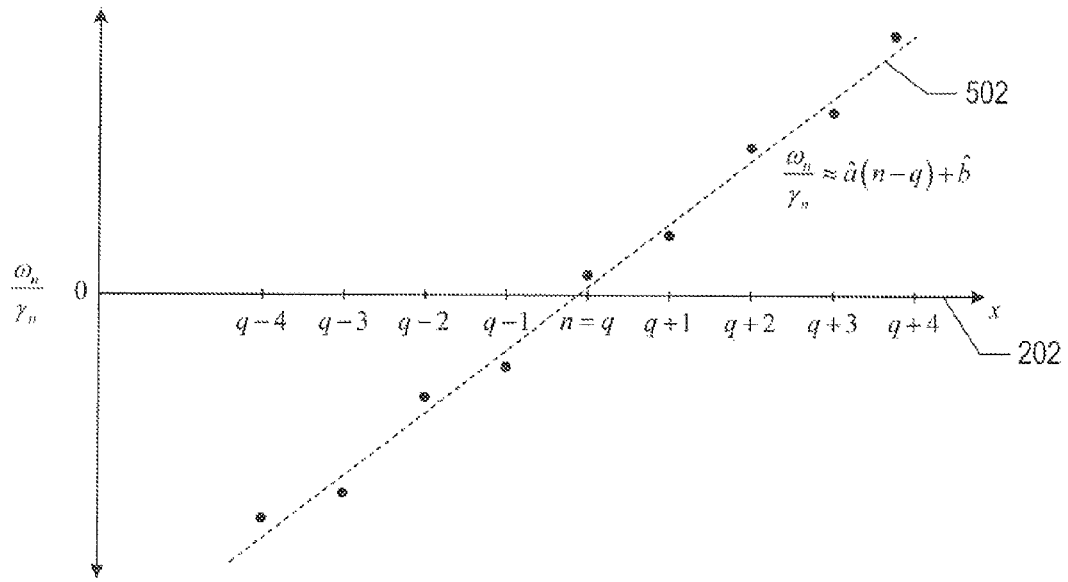
FIG. 5A shows an example plot of nine estimated time delay differences $\omega_n/\gamma_n$.
Figure 5B:
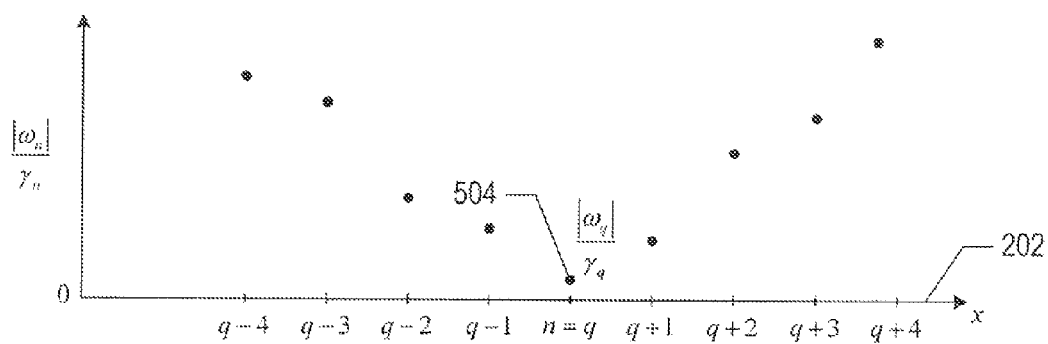
FIG. 5B shows an example plot of $|\omega_n|/\gamma_n$.

FIG. 5A shows an example plot of nine estimated time delay differences $\omega_n/\gamma_n$ along a portion of the x-axis 202. Each point along the x-axis 202 represents a microphone in the microphone/processor array. The linear model 502 representing nine linearly distributed time delay differences is plotted for R=4. FIG. 5B shows an example plot of $|\omega_n|/\gamma_n$ for the same values of n along the same portion of the x-axis 202, shown in FIG. 5A. As shown in FIG. 5B, the minimum time delay difference $|\omega_q|/\gamma_q$ is represented by point 502 occurring at n=q.

Only the values of $|\omega_n|/\gamma_n$ for n=q−R, q−R+1, ... q+R−1, and q+R are used in applying linear regression to solve for the parameters $\hat{a}$ and $\hat{b}$ in Equation (11), which are given by $$\hat{a} = \frac{3}{R(R+1)(2R+1)}\sum_{n=q-R}^{q+R}(n-q)\omega_n/\gamma_n, \text{ and} \qquad \text{Eq. (12a)}$$

$$\hat{b} = \frac{1}{2R+1}\sum_{n=q-R}^{q+R}\omega_n/\gamma_n \qquad \text{Eq. (12b)}$$

The parameters $\hat{a}$ and $\hat{b}$ can be used to determine the approximate sound source location $(\hat{u},\hat{v})$ by setting Equation (11) equal to Equation (7) as follows:

$$(\delta_{n+1}-\delta_{n-1})\approx \hat{a}(n-q)+\hat{b} \qquad \text{Eq. (13)}$$

The time delay difference $(\delta_{n+1}-\delta_{n-1})$ can also be written as a function of the sound source location coordinates u and v by expanding $(\delta_{n+1}-\delta_{n-1})$ in a Taylor series to obtain $$(\delta_{n+1}-\delta_{n-1}) \approx \frac{n-u}{v}\left[2-\frac{(n-u)^2+1}{v^2}\right] \qquad \text{Eq. (14)}$$

the derivation of which is presented below in APPENDIX II. Solving Equations (14) and (15) for u and v gives the approximate source location coordinates:

$$\hat{u}=q-\hat{b}/\hat{a} \qquad \text{Eq. (15a)}$$

$$\hat{v}=2/\hat{a} \qquad \text{Eq. (15b)}$$

Coordinates for the sound source location 208, shown in FIG. 2, are given by $$(x_s,y_s)\approx(h\hat{u},h\hat{v}) \qquad \text{Eq. (16)}$$

Figure 6A:
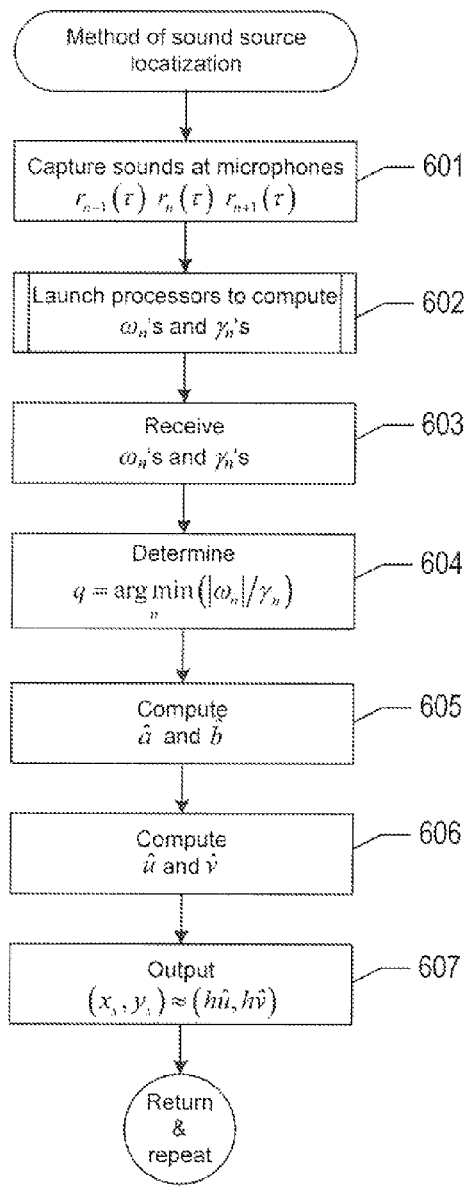
FIGS. 6A-6B shows flow diagrams summarizing a first method for computing an approximate coordinate location of a sound source using a one-dimensional microphone/processor array.

FIG. 6A shows a flow diagram summarizing a method for computing an approximate coordinate location of a sound source using a one-dimensional microphone/processor array. In stage 601, each microphone of a microphone array captures and transmits an audio signal $r_n(\tau)$ to a connected processor, as described above with reference to FIG. 2. In stage 602, the processors are launched so that the processors of the microphone/processor array in parallel compute $\omega_n$'s and $\gamma_n$'s and send the $\omega_n$'s and $\gamma_n$'s to a computing device for processing, as described in the flow diagram shown in FIG. 6B. In stage 603, the computing device receives the $\omega_n$'s and $\gamma_n$'s from the processors of the microphone/processor array, as described above with reference to FIG. 2. In stage 604, $$q = \underset{n}{\operatorname{argmin}}(|\omega_n|/\gamma_n)$$

is determined, as described above with reference to FIGS. 5A-5B. In stage 605, the linear regression parameters $\hat{a}$ and $\hat{b}$ are computed in accordance with Equations (12a) and (12b), respectively. In stage 606, approximate source location coordinates $\hat{u}$ and $\hat{v}$ are computed in accordance with Equations (15a) and (15b), respectively. In stage 607, the sound source location coordinates are output.

Figure 6B:
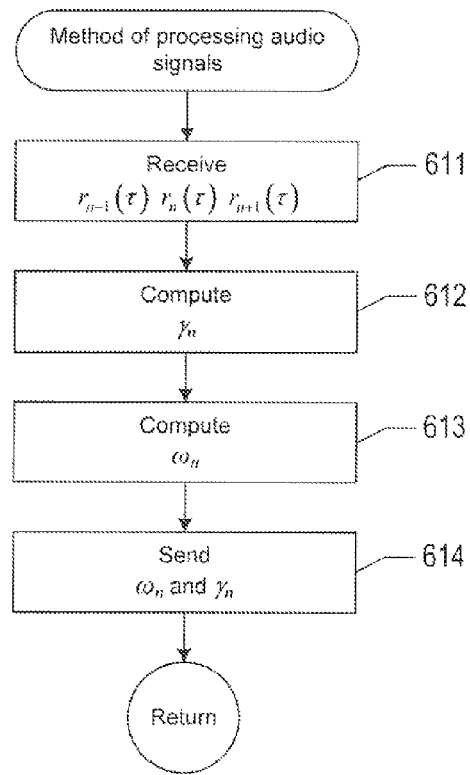

FIG. 6B shows a flow diagram summarizing a method for computing $\omega_n$ and $\gamma_n$ at each processor launched in stage 602 of the method shown in FIG. 6A. In stage 611, a processor connected to a microphone receives the audio signal $r_n(\tau)$ from the connected microphone and receives the audio signal $r_{n-1}(\tau)$ from adjacent processor n−1 and receives the audio signal $r_{n+1}(\tau)$ from adjacent processor n+1, as described above with reference to FIG. 4A. In stage 612, the processor computes the normalizing factor $\gamma_n$, as described above with references to Equation (9) and FIG. 4B. In stage 613, the processor computes $\omega_n$, as described above with reference to Equation (8) and FIG. 4B. In stage 614, $\omega_n$ and $\gamma_n$ are sent to the computing device for processing.

In alternative examples, the signal processing operations performed by each processor of a microphone/processor array is now described for a second system and method of determining an approximate coordinate location of the sound source 208. In the first stage of determining the approximate coordinate location of the sound source 208, each processor n is also configured to determine an estimate of the squared time delay difference $(\delta_{n+1}-\delta_{n-1})^2$ between the microphones n−1 and n+1 located adjacent to the microphone n and is given by:

$$\frac{\theta_n}{\gamma_n} = (\delta_{n+1} - \delta_{n-1})^2 + \varepsilon_n \quad \text{Eq. (17)}$$

where $$\theta_n = \int_0^T \psi(\tau)[r_{n-1}(\tau) - r_{n+1}(\tau)]^2 d\tau \quad \text{Eq. (18)}$$

Like Equations (7)-(9), Equations (17)-(18) are also obtained by assuming the time delay difference is small as explained below in APPENDIX I.

Figure 7A:
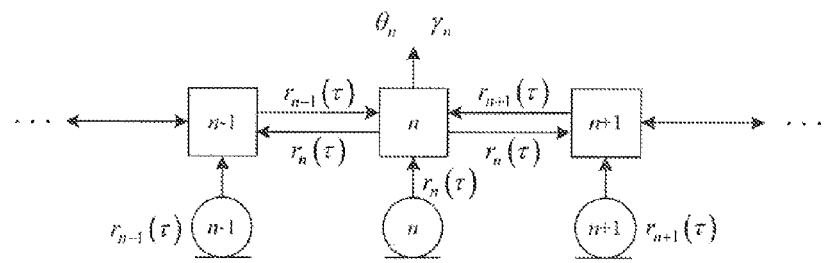
FIG. 7A shows an example of audio signals sent to a processor.
Figure 7B:
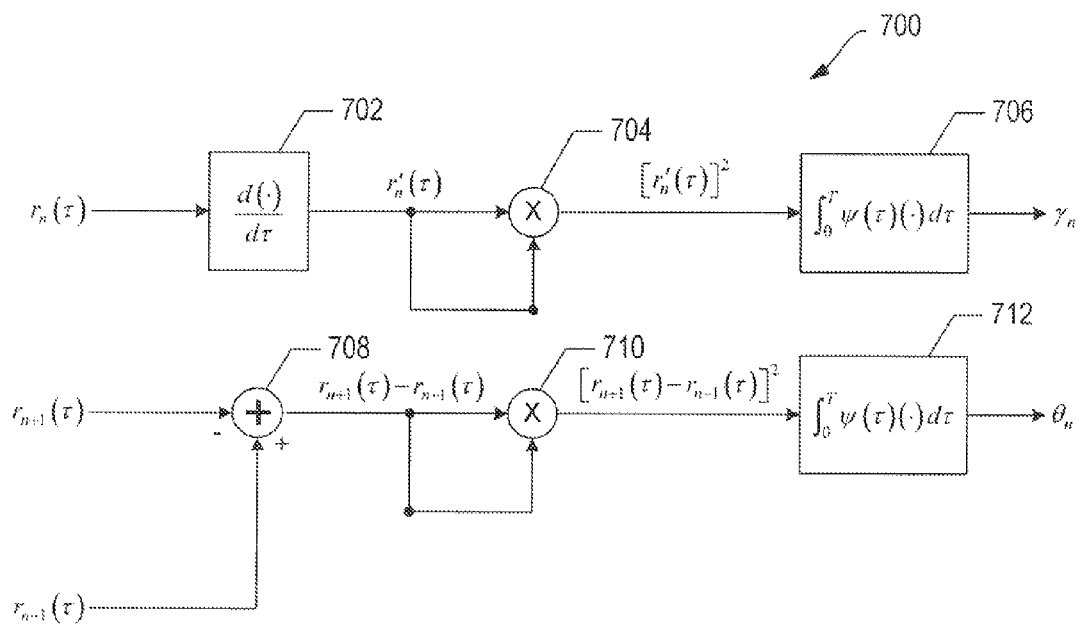
FIG. 7B shows an example block circuit diagram representing signal processing operation performed by a processor.

FIG. 7A shows an example of audio signals sent to the processor 17 that outputs $\theta_n$ and $\gamma_n$ (i.e., $\theta_n/\gamma_n \approx (\delta_{n-1} - \delta_{n+1})^2$). As show in FIG. 7A, the processors n−1, n, and n+1 receive the audio signals $r_{n-1}(\tau)$, $r_n(\tau)$, and $r_{n+1}(\tau)$ from the microphones n−1, n, and n+1, respectively. The processor 17 then receives the audio signal $r_{n-1}(\tau)$ from the adjacent processor n−1 and receives the audio signal $r_{n+1}(\tau)$ from the adjacent processor n+1. FIG. 7B shows an example of a block circuit diagram 700 representing the signal processing operations performed by the processor n on the audio signals $r_{n-1}(\tau)$, $r_n(\tau)$, and $r_{n+1}(\tau)$. As shown in FIG. 7B, and as described above with reference to FIG. 4B, the audio signal $r_n(\tau)$ produced by the microphone n is input to a derivate generating element 702, which outputs the derivative $r_n'(\tau)$ squared at product junction 704 to produce $[r_n'(\tau)]^2$, which, in turn, is input to integrating element 706 producing normalizing factor $\gamma_n$. The audio signals produced by the processors n−1 and n+1 are input to a summing junction 708, which outputs audio signal difference $r_{n+1}(\tau) - r_{n-1}(\tau)$. The audio signal difference $r_{n+1}(\tau) - r_{n-1}(\tau)$ is squared at product junction 710 to produce $[r_{n+1}(\tau) - r_{n-1}(\tau)]^2$, which, in turn, is input to integrating element 712 producing $\theta_n$. The processor n then outputs $\theta_n$ and $\gamma_n$, as shown in FIG. 7A.

Next, the values $\theta_n$ and $\gamma_n$ output from each processor are sent to a computing device to determine an approximate sound source location $(\hat{u}, \hat{v})$. A derivation for the equations used to determine $(\hat{u}, \hat{v})$ for the second system and method is now described. The estimated squared time delay differences $\theta_n/\gamma_n$ have a parabolic distribution. The parabolic distribution of the squared time delay differences $\theta_n/\gamma_n$ enables the approximate sound source location $(\hat{u}, \hat{v})$ to be determined by solving a quadratic model of the form $$\frac{\theta_n}{\gamma_n} \approx \hat{a}'(n-q)^2 + \hat{b}'(n-q) + \hat{c}' \quad \text{Eq. (19)}$$

where n=q−R, q−R+1, ..., q+R−1, and q+R and $$q = \underset{n}{\operatorname{argmin}}(\theta_n/\gamma_n),$$

using regression. In other words, finding the solution that minimizes the sum of squared errors (difference between model's and measured values) using standard techniques. As described above for $|\omega_n|/\gamma_n$, the minimum squared time delay difference $\theta_n/\gamma_n$ occurs at n=q, where R is an integer selected to define a neighborhood surrounding q.

Figure 8:
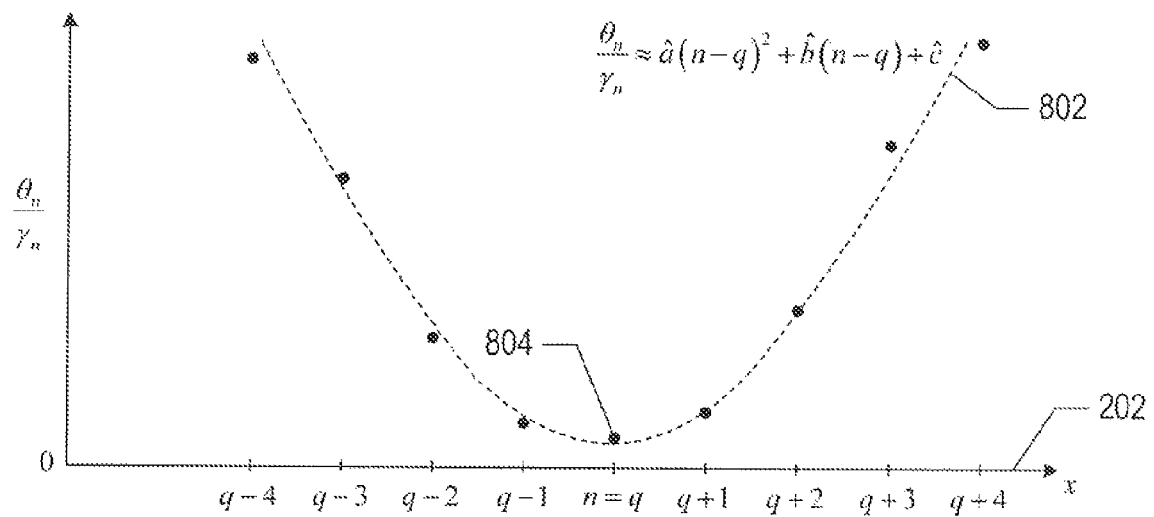
FIG. 8 shows an example plot of nine estimated time delay differences $\theta_n/\gamma_n$.

FIG. 8 shows an example plot of nine estimated squared time delay differences $\theta_n/\gamma_n$ along a portion of the x-axis 202. Each point along the x-axis 202 represents a microphone in a microphone/processor array. The quadratic model 802 representing the distribution of nine squared time delay differences is plotted for R=4. As shown in FIG. 8, the minimum time delay difference is $\theta_q/\gamma_q$ is represented by a point 804 occurring at n=q.

Only the values of $\theta_n/\gamma_n$ for n=q−R, q−R+1, ..., q+R−1, and q+R are used in applying regression to solve for the parameters â' and b̂' in Equation (19), which are given by the solution of this system of equations $$P_1 \hat{a}' + P_2 \hat{c}' = \sum_{n=q-R}^{q+R} (n-q)^2 \theta_n / \gamma_n$$

$$P_2 \hat{b}' = \sum_{n=q-R}^{q+R} (n-q) \theta_n / \gamma_n$$

$$P_2 \hat{a}' + P_3 \hat{c}' = \sum_{n=q-R}^{q+R} \theta_n / \gamma_n$$

where $$P_1 = 2R^5/5 + R^4 + 2R^3/3 - R/30$$

$$P_2 = 2R^3/3 + R^2 + R/3$$

$$P_3 = 2R + 1$$

Solving this system of equations gives the parameters â', b̂' and ĉ', which can be used to determine the approximate sound source location $(\hat{u}, \hat{v})$ by setting Equation (19) equal to Equation (17) as follows:

$$(\delta_{n+1} - \delta_{n-1}) \approx \hat{a}'(n-q)^2 + \hat{b}'(n-q) + \hat{c}' \quad \text{Eq. (21)}$$

The time delay difference $(\delta_{n+1} - \delta_{n-1})^2$ can also be written as a function of the sound source location coordinates u and v by expanding $(\delta_{n+1} - \delta_{n-1})$ as described above with reference to Equation (14). Solving Equations (14) and (21) for u and v gives the approximate source location coordinates:

$$\hat{u}' = q - \hat{b}'/(2\hat{a}') \quad \text{Eq. (22a)}$$

$$\hat{v}' = 2/\sqrt{\hat{a}'} \quad \text{Eq. (22b)}$$

Coordinates for the sound source location 208, shown in FIG. 2, are given by $$(x_s, y_s) \approx (h\hat{u}', h\hat{v}') \quad \text{Eq. (23)}$$

Figure 9A:
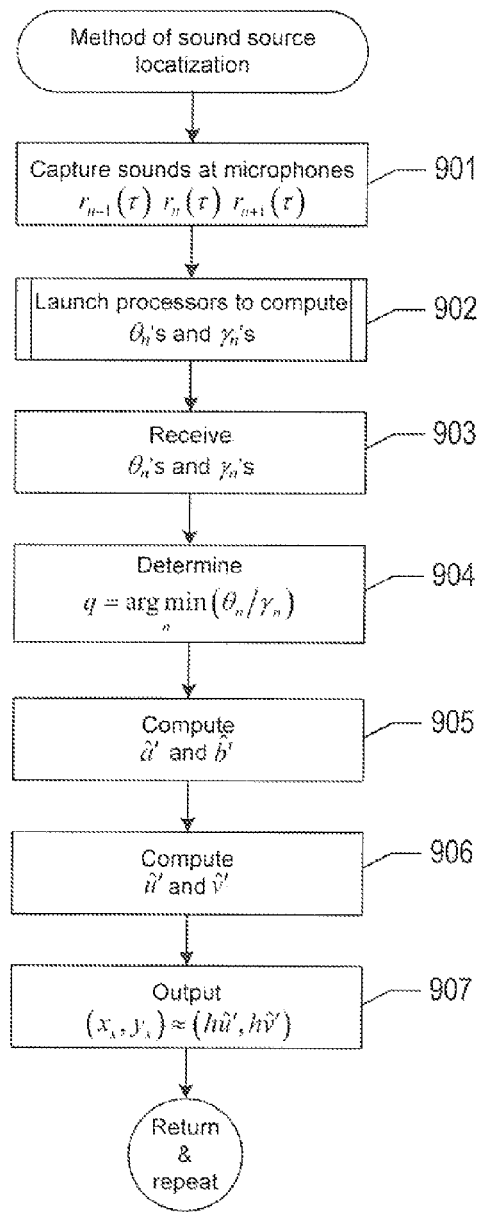
FIGS. 9A-9B shows flow diagrams summarizing a second method for computing an approximate coordinate location of a sound source using a one-dimensional microphone/processor array.

FIG. 9A shows a flow diagram summarizing a method for computing an approximate coordinate location of a sound source using a one-dimensional microphone/processor array. In stage 901, each microphone of a microphone array captures and transmits an audio signal $r_n(\tau)$ to a connected processor, as described above with reference to FIG. 2. In stage 902, the processors are launched so that the processors of the microphone/processor array in parallel compute $\theta_n$'s and $\gamma_n$'s and send the $\theta_n$'s and $\gamma_n$'s to a computing device for processing, as described in the flow diagram shown in FIG. 9B. In stage 903, the computing device receives the $\theta_n$'s and $\gamma_n$'s from the processors of the microphone/processor array, as described above with reference to FIG. 2. In stage 904, $$q = \underset{n}{\operatorname{argmin}}(\theta_n/\gamma_n)$$

is determined, as described above with reference to FIG. 8. In stage 905, regression parameters â' and b̂' are computed in accordance with Equations (20a) and (20b), respectively. In stage 906, approximate source location coordinates û' and v̂' are computed in accordance with Equations (22a) and (22b), respectively. In stage 907, the sound source location coordinates are output.

Figure 9B:
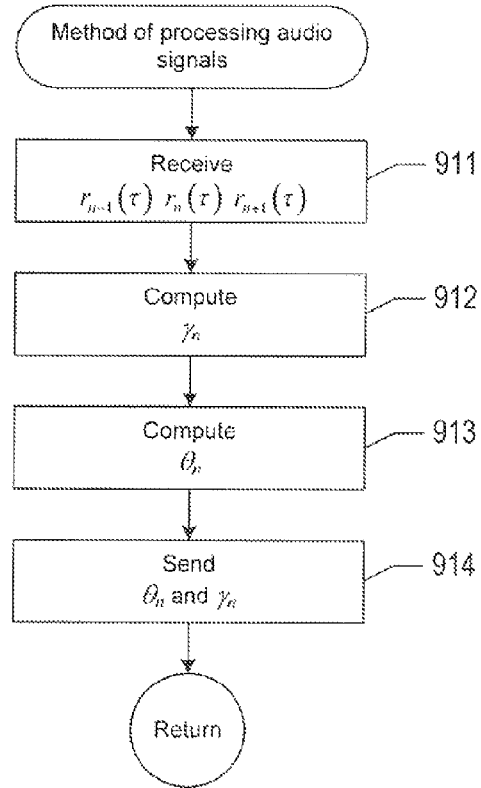

FIG. 9B shows a flow diagram summarizing a method for computing $\theta_n$ and $\gamma_n$ at each processor launched in stage 902 of the method shown in FIG. 9A. In stage 911, a processor connected to a microphone receives the audio signal $r_n(\tau)$ from the connected microphone and receives the audio signal $r_{n-1}(\tau)$ from adjacent processor n−1 and receives the audio signal $r_{n+1}(\tau)$ from adjacent processor n+1, as described above with reference to FIG. 7A. In stage 912, the processor computes normalizing factor $\gamma_n$, as described above with references to Equation (9) and FIG. 7B. In stage 913, the processor computes $\theta_n$, as described above with reference to Equation (18) and FIG. 7B. In stage 914, $\theta_n$ and $\gamma_n$ are sent to the computing device for processing.

Methods are not limited to computing $\omega_n$, $\theta_n$, and $\gamma_n$ at the processor n based on the time delay difference $(\delta_{n+1}-\delta_{n-1})$. In alternative examples, the time delay difference $(\delta_n-\delta_{n-1})$ can be used to compute $\omega_n$, $\theta_n$, and $\gamma_n$. Thus, the linear model is given by $$\frac{\omega_n}{\gamma_n} = (\delta_n - \delta_{n-1}) + \varepsilon_n \qquad \text{Eq. (24)}$$

where $$\omega_n = \int_0^T \psi(\tau) r_n'(\tau)[r_{n-1}(\tau) - r_n(\tau)] d\tau \qquad \text{Eq. (25)}$$

And the quadratic model is given by $$\frac{\theta_n}{\gamma_n} = (\delta_n - \delta_{n-1})^2 + \varepsilon_n \qquad \text{Eq. (26)}$$

where $$\theta_n = \int_0^T \psi(\tau)[r_{n-1}(\tau) - r_n(\tau)]^2 d\tau, \qquad \text{Eq. (27)}$$

and

In still other examples, the time delay different $(\delta_{n+1}-\delta_n)$ can be used to compute $\omega_n$, $\theta_n$, and $\gamma_n$. Thus, the linear model is given by $$\frac{\omega_n}{\gamma_n} = (\delta_{n+1} - \delta_n) + \varepsilon_n \qquad \text{Eq. (28)}$$

where $$\omega_n = \int_0^T \psi(\tau) r_n'(\tau)[r_n(\tau) - r_{n+1}(\tau)] d\tau \qquad \text{Eq. (29)}$$

And the quadratic model is given by $$\frac{\theta_n}{\gamma_n} = (\delta_{n+1} - \delta_n)^2 + \varepsilon_n \qquad \text{Eq. (30)}$$

where $$\theta_n = \int_0^T \psi(\tau)[r_n(\tau) - r_{n+1}(\tau)]^2 d\tau \qquad \text{Eq. (31)}$$

The linear and quadratic models for computing $\omega_n$, $\theta_n$, and $\gamma_n$ assume that all of the microphones of a microphone/processor array are calibrated, so that computing $\omega_n$ and $\theta_n$ based on the audio signal differences $r_{n-1}(\tau)-r_{n+1}(\tau)$, $r_{n-1}(\tau)-r_n(\tau)$, or $r_n(\tau)-r_{n+1}(\tau)$ are unbiased. Methods include another approach in which the audio signals are quantized to one bit that represents an audio signal's polarity or sign. The audio signals can be quantized in a processed represented mathematically by a sign function $$\Pi(x) = \begin{cases} +1, & x \geq 0 \\ -1, & x < 0 \end{cases}$$

Instead of using Equation (8), the linear model is based on $$\Omega_n = (\delta_{n+1} - \delta_{n-1}) + \varepsilon_n$$

where $$\Omega_n = \frac{1}{T}\int_0^T \Pi(r_n'(\tau))[\Pi(r_{n-1}(\tau)) - \Pi(r_{n+1}(\tau))] d\tau$$

And the quadratic model is based on $$\Theta_n = (\delta_{n+1} - \delta_{n-1})^2 + \varepsilon_n$$

where $$\Theta_n = \frac{1}{T}\int_0^T [\Pi(r_{n-1}(\tau)) - \Pi(r_{n+1}(\tau))]^2 d\tau$$

Figure 10:
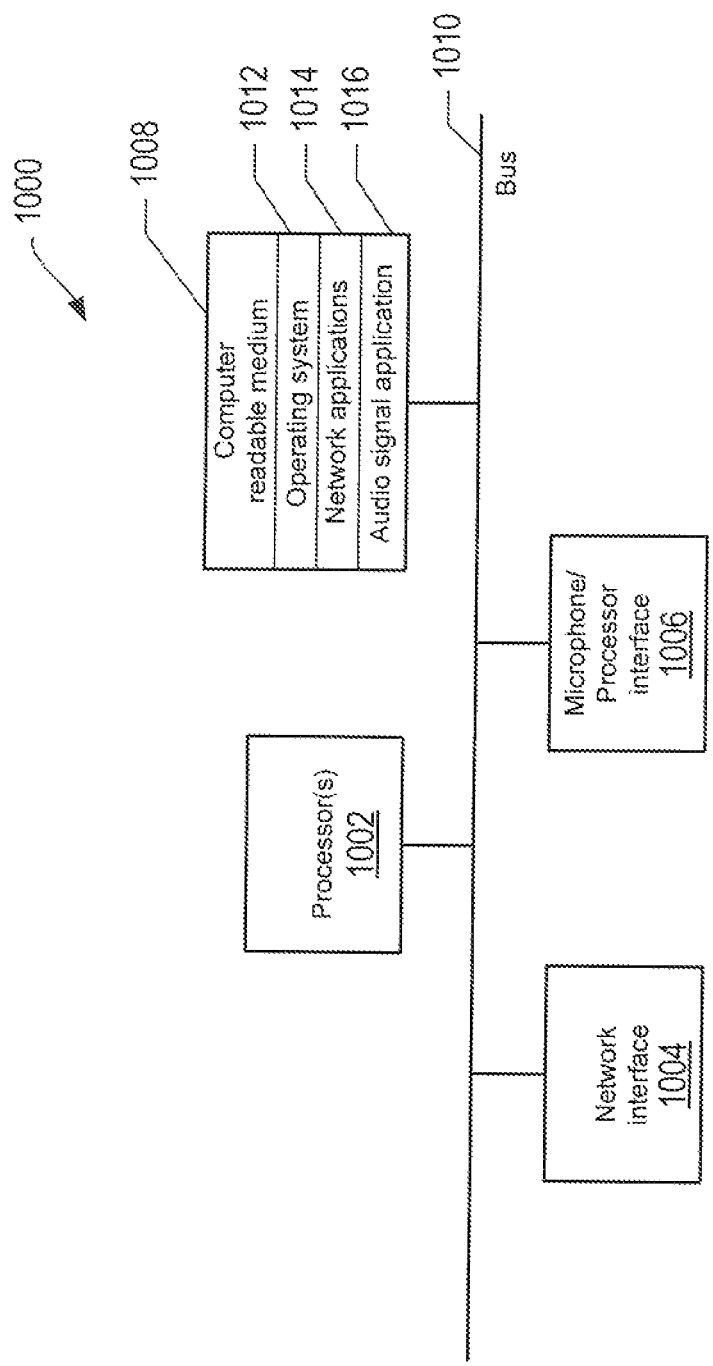
FIG. 10 shows a schematic representation of a computing device.

Methods of computing the sound source coordinates $(x_s, y_s)$ based on the linear and quadratic models are described above with reference to a computing device. The computing device can be a desktop computer, a laptop, or any other suitable device configured to carry out processing and data storage. FIG. 10 shows a schematic representation of a computing device 1000. The device 1000 includes one or more processors 1002, such as a central processing unit; one or more network interfaces 1004, such as a Local Area Network LAN, a wireless 802.11x LAN, a 3G or 4G mobile WAN or a WiMax WAN; a microphone/processor interface 1006; and one or more computer-readable mediums 1008. Each of these components is operatively coupled to one or more buses 1010. For example, the bus 1010 can be an EISA, a PCI, a USB, a FireWire, a NuBus, or a PDS.

The computer readable medium 1008 can be any suitable medium that participates in providing instructions to the processor 1002 for execution. For example, the computer readable medium 1008 can be non-volatile media, such as firmware, an optical disk, a magnetic disk, or a magnetic disk drive; volatile media, such as memory; and transmission media, such as coaxial cables, copper wire, and fiber optics. The computer readable medium 1008 can also store other software applications, including word processors, browsers, email, Instant Messaging, media players, and telephony software.

The computer-readable medium 1008 may also store an operating system 1012, such as Mac OS, MS Windows, Unix, or Linux; network applications 1014; and a audio signal processing application 1016. The operating system 1014 can be multi-user, multiprocessing, multitasking, multithreading, real-time and the like. The operating system 1012 can also perform basic tasks such as recognizing input from input devices, such as a keyboard, a keypad, or a mouse; sending output to a projector and a camera; keeping track of files and directories on medium 1008; controlling peripheral devices, such as disk drives, printers, image capture device; and managing traffic on the one or more buses 1010. The network applications 1014 include various components for establishing and maintaining network connections, such as software for implementing communication protocols including TCP/IP, HTTP, Ethernet, USB, and Firewire.

The audio signal processing application 1016 provides various software components for computing approximate sound source coordinates $(x_s, y_s)$ based on the linear and quadratic models for computing $\omega_n$, $\theta_n$, and $\gamma_n$. In certain examples, some or all of the processes performed by the application 1016 can be integrated into the operating system 1012. In certain examples, the processes of the application may also at least partially be implemented in digital electronic circuitry, or in computer hardware, firmware, software, or in any combination thereof.

APPENDIX I

Equations (7)-(9), (17), and (18) are determined by assuming the analog audio signal $s(\tau)$ representing the sound generated by the sound source 208, shown in FIG. 2, is a continuous analytic function. Using $s^{(k)}(\tau)$ to represent the functions $k^{th}$ derivative (e.g., $s'(\tau) = s^{(1)}(\tau)$), the signal differences measured by two microphones in the one-dimensional array of microphones can be expanded in a Taylor series as follows:

$$r_m(\tau) - r_n(\tau) = s(\tau - \delta_m) - s(\tau - \delta_n)$$
$$= s'(\tau - \delta_n)(\delta_n - \delta_m) +$$
$$\sum_{k=2}^{\infty} s^{(k)}(\tau - \delta_n) \frac{(\delta_n - \delta_m)^k}{k!}$$

When the difference between time delays is small (i.e., $|\delta_n - \delta_m| \ll 1$), this Taylor series is dominated by the first term. Thus, an estimate of the time delay difference $(\delta_{n+1} - \delta_{n-1})$ between the microphones n−1 and n+1 adjacent to a microphone n can be approximated by Equations (7)-(9), or the squared time delay difference $(\delta_{n+1} - \delta_{n-1})^2$ between the microphones n−1 and n+1 adjacent to a microphone n can be approximated by Equations (17)-(18).

APPENDIX II

The methods are predicated on the microphone separation distance h being small enough that the time delay differences between adjacent microphones is very small. As a result, Equation (6) can be rewritten as $$\delta_n = v\sqrt{1 + \left(\frac{n-u}{v}\right)^2}$$

and expanded in a Taylor series to obtain $$\delta_n = v + \frac{v}{2}\left[\frac{n-u}{v}\right]^2 - \frac{v}{8}\left[\frac{n-u}{v}\right]^4 + \frac{v}{16}\left[\frac{n-u}{v}\right]^6 - \ldots$$

Keeping only the first two terms, by assuming $|n-u| < v$, results in $$\delta_{n+1} - \delta_{n-1} \approx \frac{n-u}{v}\left[2 - \frac{(n-u)^2 + 1}{v^2}\right]$$

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented for purposes of illustration and description. They are not intended to be exhaustive of or to limit this disclosure to the precise forms described. Obviously, many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

The invention claimed is:

1. A sound source localization method comprising:
providing an array of microphones and an array of processors connected and corresponding to the array of microphones in a one processor-to-one microphone manner such that each microphone is connected to a different processor, and each processor, as a given processor, is connected to each other processor of the array of processors to which the given processor is adjacent;
at each microphone and connected processor,
converting a sound detected by each microphone into an audio signal, the sound generated by a sound source located in front of the microphone array,
receiving the audio signal from the microphone and audio signals from at least one of the adjacent processors,
determining the time delay difference between two microphones, and
sending the time delay difference to a computing device; and
computing an approximate coordinate location of the sound source at the computing device based on the time delay differences sent from the array of processors.

2. The method of claim 1, wherein receiving the audio signals from at least one of the adjacent processors further comprises the at least one adjacent processors receiving the audio signals from connected microphones.

3. The method of claim 1, wherein determining the time delay difference between two microphones further comprises computing a linear time delay difference.

4. The method of claim 3, wherein the linear time delay difference further comprises $$\frac{\omega_n}{\gamma_n}$$

where $$\omega_n = \int_0^T \psi(\tau) r'_n(\tau) F(\tau) \, d\tau, \text{ and}$$

$$\gamma_n = \int_0^T \psi(\tau) [r'(\tau)_n]^2 \, d\tau$$

$\omega_n$ and $\gamma_n$ are values, $\psi(\tau)$ is a window function with the property that $\psi(\tau)>0$ for $\tau\in(0,T)$, T is a selected period of time, $F(\tau)$ is a function, and $r_n(\tau)$ is the analog audio signal detected by the microphone connected to the processor.

5. The method of claim 4, wherein $F(\tau)$ further comprises one of $r_{n-1}(\tau)-r_{n+1}(\tau)$, $r_n(\tau)-r_{n+1}(\tau)$, and $r_{n-1}(\tau)-r_n(\tau)$, where $r_{n-1}(\tau)$ is the audio signal sent from a first adjacent microphone to the microphone and $r_{n+1}(\tau)$ is the audio signal sent from a second adjacent microphone.

6. The method of claim 3, wherein the linear time delay difference further comprises computing $$\Omega_n = \frac{1}{T}\int_0^T \Pi(r'_n(\tau))[\Pi(r_{n-1}(\tau)) - \Pi(r_{n+1}(\tau))]d\tau$$

associated with a linear time delay difference model, where $\Pi(g)$ is a sign function, $r_n(\tau)$ is the analog audio signal detected by the microphone connected to the processor, $r_{n-1}(\tau)$ is the audio signal sent from a first adjacent microphone to the microphone, and $r_{n+1}(\tau)$ is the audio signal sent from a second adjacent microphone.

7. The method of claim 1, wherein computing an approximate coordinate location of the sound source further comprises computing $$\hat{u}=q-\hat{b}/\hat{a} \text{ and } \hat{v}=2/\hat{a}$$

where $(h\hat{u}, h\hat{v})$ are the approximate coordinates of the sound source, h is the distance between microphones, and the parameters $\hat{a}$ and $\hat{b}$ of a linear model representing the distribution of the time delay differences output from the processors.

8. The method of claim 1, wherein determining the time delay difference between two microphones further comprises computing a quadratic time delay difference.

9. The method of claim 8, wherein computing the quadratic time delay difference further comprises $$\frac{\theta_n}{\gamma_n}$$

where $$\theta_n = \int_0^T \psi(\tau)G(\tau)d\tau, \text{ and}$$

$$\gamma_n = \int_0^T \psi(\tau)[r'(\tau)_n]^2 d\tau$$

associated with a linear time delay difference distribution, where $\theta_n$ and $\gamma_n$ are values, $\psi(\tau)$ is a window function with the property that $\psi(\tau)>0$ for $\tau\in(0,T)$, T is a selected period of time, $G(\tau)$ is a function, and $r_n(\tau)$ is the analog audio signal detected by the microphone connected to the processor.

10. The method of claim 9, wherein $G(\tau)$ further comprises one of $[(r_{n-1}(\tau)-r_{n+1}(\tau)]^2$, $[r_n(\tau)-r_{n+1}(\tau)]^2$, and $[r_{n-1}(\tau)-r_n(\tau)]^2$, where $r_{n-1}(\tau)$ is the audio signal sent from a first adjacent microphone to the microphone and $r_{n+1}(\tau)$ is the audio signal sent from a second adjacent microphone.

11. The method of claim 8, wherein computing the quadratic time delay difference further comprises computing $$\Theta_n = \frac{1}{T}\int_0^T [\Pi(r_{n-1}(\tau)) - \Pi(r_{n+1}(\tau))]^2 d\tau$$

associated with a linear time delay difference model, where $\Pi(g)$ is a sign function, $r_n(\tau)$ is the analog audio signal detected by the microphone connected to the processor, $r_{n-1}(\tau)$ is the audio signal sent from a first adjacent microphone to the microphone, and $r_{n+1}(\tau)$ is the audio signal sent from a second adjacent microphone.

12. The method of claim 1, wherein computing an approximate coordinate location of the sound source further comprises computing $$\hat{u}'=q-\hat{b}'/(2\hat{a}') \text{ and } \hat{v}'=2/\sqrt{\hat{a}'}$$

where $(h\hat{u}', h\hat{v}')$ are the approximate coordinates of the sound source, h is the distance between microphones, and the parameters $\hat{a}'$ and $\hat{b}'$ of a quadratic model representing the distribution of the time delay differences output from the processors.

13. The method of claim 1, wherein the converting, receiving, determining, and sending operations are performed by the microphones and processors in parallel.

14. A distributed signal processing system comprising:
an array of microphones, each microphone detects a sound and generates an audio signal;
an array of processors connected and corresponding to the array of microphones in a one processor-to-one microphone manner such that each microphone is connected to a different processor, and each processor, as a given processor, is connected to each other processor of the array of processors to which the given processor is adjacent, enabling communication between adjacent connected processors; and
a computing device connected to each of the processors, wherein each processor is configured to receive and process the audio signals sent from a connected microphone and audio signals sent from at least one of the adjacent processors to produce a data stream that is sent to the computing device.

15. The system of claim 14, wherein the array of processors are configured to compute a first stage of audio signal processing in parallel.

16. The system of claim 14, wherein the computing device performs a second stage of audio signal processing based on the data streams received from the array of processors.

17. The system of claim 14, wherein each processor is configured to compute a linear time delay difference between sounds detected at two microphones.

18. The system of claim 14, wherein each processor is configured to compute a quadratic time delay difference between sounds detected at two microphones.

19. The system of claim 14, wherein the computing device connected to each of the processors further comprises a bus connected to the computing device and the processors, the bus configured to receive the data streams generated by the processors and transmit the data streams to the computing device.

20. The system of claim 14, wherein enabling communication between adjacent connected processors further comprises adjacent processors are configured to exchange audio signals.

* * * * *

UNITED STATES PATENT AND TRADEMARK OFFICE
CERTIFICATE OF CORRECTION

PATENT NO. : 8,515,094 B2
APPLICATION NO. : 12/902907
DATED : August 20, 2013
INVENTOR(S) : Amir Said et al.

It is certified that error appears in the above-identified patent and that said Letters Patent is hereby corrected as shown below:

In the Claims:

In column 13, line 58, in Claim 10, delete "$[(r_{n-1}(\tau)$" and insert -- $[r_{n-1}(\tau)$ --, therefor.

Signed and Sealed this
Nineteenth Day of November, 2013

Teresa Stanek Rea
*Deputy Director of the United States Patent and Trademark Office*